United States Patent Office 3,385,967
Patented May 28, 1968

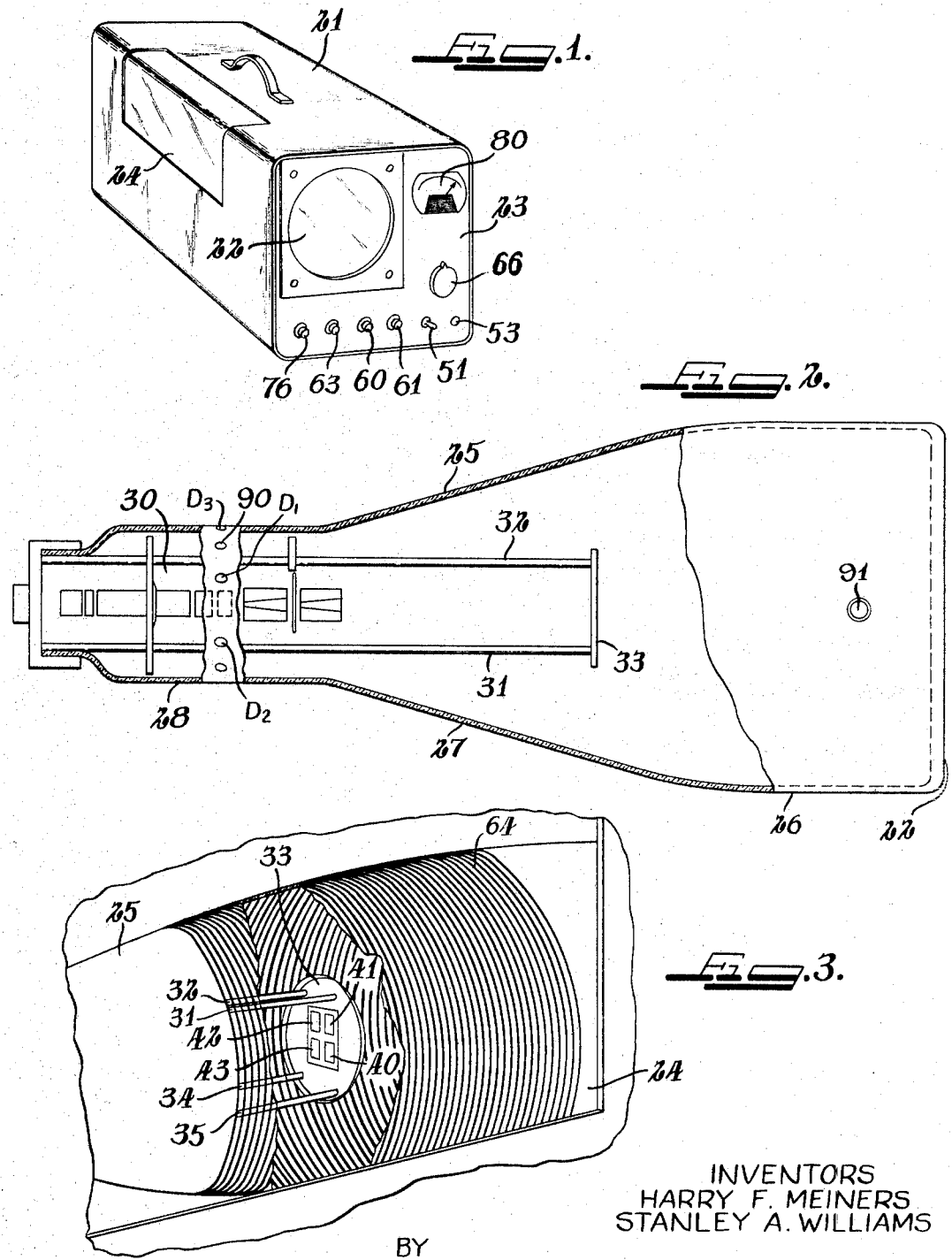
INVENTORS
HARRY F. MEINERS
STANLEY A. WILLIAMS

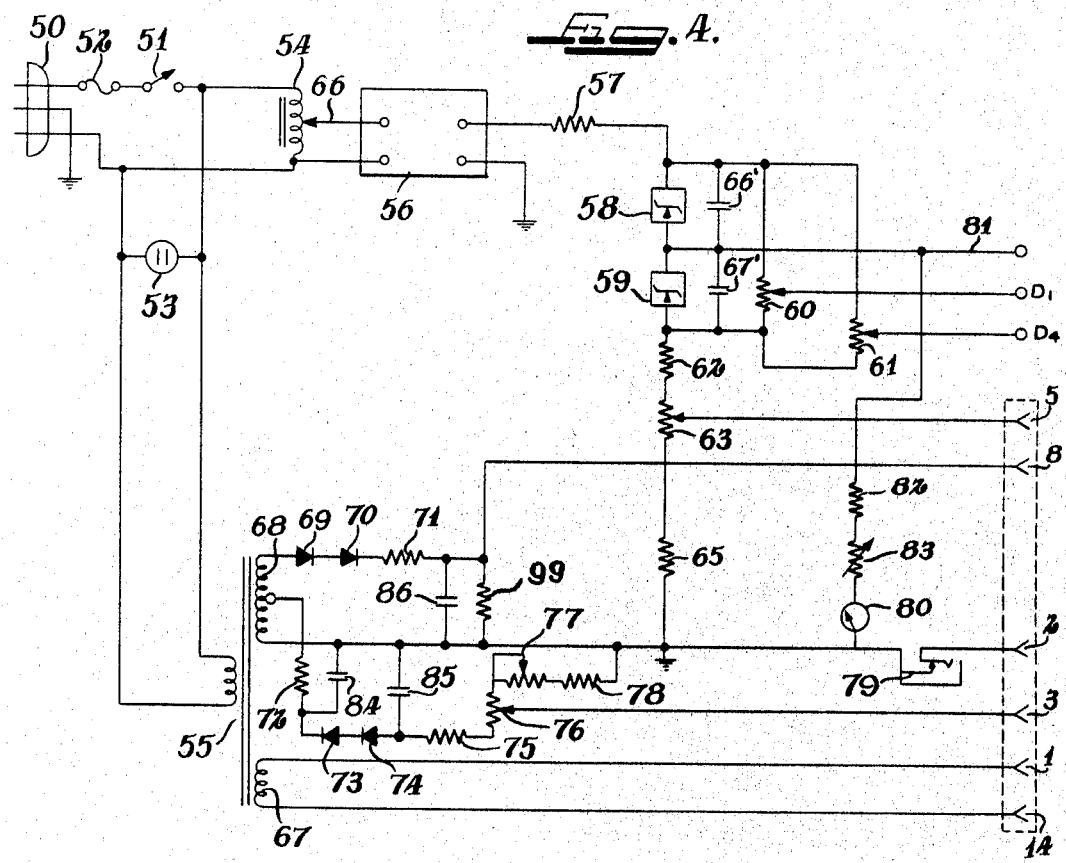
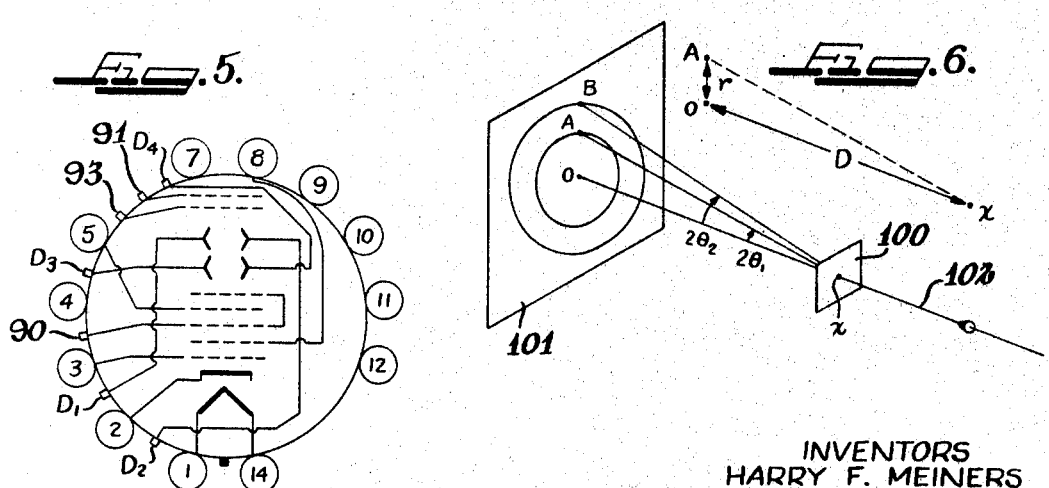
INVENTORS
HARRY F. MEINERS
STANLEY A. WILLIAMS
BY Greist, Lockwood, Greenawalt & Dewey
Attys.

3,385,967
ELECTRON DIFFRACTION APPARATUS
FOR MEASURING WAVE LENGTH OF
ELECTRONS
Harry F. Meiners, Latham, N.Y., and Stanley A. Williams, Ames, Iowa, assignors to The Welch Scientific Company, Chicago, Ill., a corporation of Illinois
Continuation-in-part of application Ser. No. 363,798, Apr. 30, 1964. This application Sept. 7, 1967, Ser. No. 675,268
8 Claims. (Cl. 250—49.5)

ABSTRACT OF THE DISCLOSURE

Apparatus for conudcting electron-diffraction experiments. This apparatus includes a permanently evacuated electron-diffraction, cathode ray tube having an electron gun mounted in the tube neck at one end and an aluminum coated phosphor screen at the opposite end. A permanently mounted target is supported in the tube approximately halfway intermediate of the electron gun and screen. A graphite coating or other suitable conductive coating is applied to the interior of the tube in a spiral strip with the spacing between laterally-adjacent strip portions generally not exceeding ¼ inch. In this manner, the anode voltage is substantially constant within the tube and visual inspection of the tube interior is permitted.

Background and description of the invention

This application is a continuation-in-part of our copending application entitled, "Apparatus for Measuring Wave Length of Electrons," Ser. No. 363,798, filed Apr. 30, 1964, now abandoned.

This invention relates to a teaching aid for use in studying the wave nature of physical particles. More particularly, the present invention is directed to an apparatus particularly suited for instructor demonstrations and student experimental use, permitting a detailed analysis of the wave nature of physical particles, such as, for example, measuring the wave length of electrons.

It has long been known that the dual character of matter can be more readily appreciated by those who experiment and discover such phenomena for themselves, however, with prior art equipment this was difficult to attain and was ordinarily left to the more advanced students. The present invention permits the student at the introductory level to undertake such experimentation, effecting measurement of the wave length of electrons through the provision of a permanently evacuated, multiple target, electron-diffraction cathode ray tube. A suitable variable voltage power supply is provided to accelerate the electrons from an electron gun towards a thin film target mounted within the tube. On striking the target, diffraction occurs, with the diffraction pattern being visibly displayed on the screen of the cathode ray tube. Physical measurement of the diffraction pattern and use of known formulas permit the student in an experiment or instructor in a demonstration study to compute the wave length of electrons to gain a better understanding of the concepts in wave particle dualism of matter.

A conductive coating is provided on the internal walls of the tube in a spiral winding or equivalent spaced-apart manner to permit visual inspection of the thin film target and at the same time provide a substantially constant anode voltage and uniform field within the tube. The power supply and tube is compactly housed in a cabinet having a window permitting inspection of the tube while maintaining the high voltage leads and power supply securely isolated from the operator for maximum safety.

The important features of the present invention will be more completely comprehended upon a consideration of the objects to be achieved and the detailed description of the invention which follows.

It is an object of this invention to provide an apparatus for use in the study of the wave nature of physical particles.

Another object of this invention is to provide a new and improved apparatus for measuring the wave length of electrons.

Another object of this invention is to provide an electron-diffraction tube having a target mounted therein which may be of polycrystalline film, single crystal film or the like for simplicity in film construction and diffraction analysis.

Another object of this invention is to provide an electron-diffraction tube which, due to its unique design and simplicity, requires relatively low voltages in operation to maintain manufacturing costs within reasonable limits.

Another object of the present invention is to provide a permanently-evacuated, multiple-target, electron-diffraction, cathode ray tube.

Another object of the present invention is to provide a permanently-evacuated, electron-diffraction tube having a conductive coating applied to the interior of the tube in a manner which provides a substantially constant anode voltage and uniform field within the tube and which also permits visual inspection of the tube interior. In this regard, a more specific object of the present invention is to apply such conductive coating as a spirally wound bead or strip wherein the distance between laterally-adjacent strip portions does not generally exceed ¼ inch.

Another object of the present invention is to provide a permanently-evacuated, electron-diffraction, cathode ray tube having an aluminum coated phosphor screen which imparts improved visibilty and brilliance to diffraction patterns produced on such screen.

Another object of the present invention is to provide a permanently-evacuated, electron-diffraction, cathode ray tube for demonstrating specific diffraction patterns which tube incorporates a target material having a high specific heat and resistance to thermal shock such that the target material will ont be adversely affected by temperatures at or below the annealing temperature of the glass forming the tube envelope.

Other objects and advantages of the present invention will be apparent when reference is made to the following description of the accompanying drawings wherein:

FIGURE 1 is a schematic view of the electron-diffraction apparatus of the present invention;

FIGURE 2 is an enlarged top plan view partly in section of the electron-diffraction tube used in the apparatus of FIGURE 1;

FIGURE 3 is an enlarged fragmentary perspective view through the window of the cabinet which houses the apparatus as shown in FIGURE 1 with the conductive coating on the tube partially broken away to illustrate the target;

FIGURE 4 is a schematic wiring diagram of the electron-diffraction apparatus of the present invention;

FIGURE 5 is a basing diagram of the cathode ray tube; and

FIGURE 6 is a schematic view of a ring diffraction pattern produced by the constructive interference of the electron waves diffracted from the various families of planes within the randomly oriented crystals in a thin film target.

Actual experience with electron diffraction study has been restricted to a relatively few students in advanced laboratories to date. Vacuum systems together with conventional type equipment and a lack of the high skill needed to make thin film targets has presented obstacles sufficiently formidable to discourage most physic departments and lecture demonstrators from attempting to provide students with experience in this area, notwithstanding a recognized need for the same.

The present invention illustrated in assembled condition in the perspective view of FIGURE 1 is an electron-diffraction apparatus which permits instantaneous analysis of the wave nature of physical particles without encountering the previously noted difficulties. A cabinet 21 houses an electron diffraction tube, the face of which is shown at 22, with a suitable control panel 23 providing a mounting for the operating controls. A window 24 is formed in the side and top walls of the cabinet 21 for purposes to become apparent.

A cathode ray tube 25 is shown in the enlarged top plan view of FIGURE 2 in free body form, the type being the same as that shown mounted in the cabinet 21. Tube 25 includes the screen or face 22 which is mounted so as to be generally flush with the control panel 23 and is of the usual configuration extending from an enlarged cylindrical section adjacent the face 22 through an inwardly tapering frusto-conical section 27 to a rearwardly disposed cylindrical neck 28 of reduced diameter which houses the electron gun shown generally at 30. The electron gun 30 mounts ceramic coated rod members 31 and 32 each having a central conductor leading from an external connection to a target frame 33 at the outer end thereof. As is shown in FIGURE 3, four such rods 31, 32, 34 and 35 serve to support the target frame 33 in substantial alignment with the electron gun 30 in the path of the electrons generally parallel to the face 22 on the cathode ray tube.

In the illustrated embodiment the target frame 33 is provided with target subframes 40, 41, 42 and 43 which are snapped into the main frame 33. Each target frame 40–43 measures about 1 centimeter square and is removably fitted into the main frame 33, being held in place by any known means. It is necessary that the targets will be held securely so as to not become dislodged during shipping and handling of the tube 25.

Each of the target frames is provided with a stainless steel mesh having approximately 100 openings per square centimeter. A platinum mesh of similar construction is equally suitable however, stainless steel is preferred for economy reasons. A series of diverse types of target materials are held on the mesh centrally of the frame on each of the targets 40–43.

Target materials which may be employed include those which provide suitable diffraction patterns on the screen 22. Preferably, these materials should also be characterized by a minimal breakdown at temperatures at or below the melting points of the glass. For example, pyrolytic graphite (more commonly known as p-graphite) is particularly suitable by reason of its high specific heat which enables the material to absorb heat and resist thermal shock. In addition, p-graphite when held at high temperature during the manufacturing process, anneals and the usual random planes adjust to form crystalline graphite. The variable thickness of oriented planes in the graphite allow many different patterns to be obtained from one specimen. Other suitable target materials include polycrystalline aluminum, magnesium oxide, manganese oxide, molybdenum oxide, germanium, alpha iron and mica. Other materials exhibiting properties and characteristics similar to these materials may be likewise used as target materials.

The electron gun 30 is a special design having a rated anode voltage of 10,000 volts D.C. or more. Under typical operating conditions the anode voltage will be of the order of 8,000 volts D.C. and may go as low as 3,000 volts D.C. The focusing electrode operates between 2,450 and 3,000 volts, the first grid −70 to −145 volts D.C. The deflecting factors between the first and second deflection plates are of the order of 155 to 195 volts D.C. per inch while the remaining plates have values of 125 to 160 volts D.C. per inch. Conventional guns such as an RCA 7Jp4 or the like can be used, but the gun design having the rated characteristics outlined above has been found to produce better results.

The thin film target is placed on the 1 centimeter square subframe and in some instances does not completely cover the subframe. For example, in the cases of face centered cubic aluminum, the frame is almost completely covered whereas with p-graphite the converse is true.

When target materials having a low specific heat are employed, it is preferred to have more than one of the subframes covered with the same type of material since such materials are susceptible to burning and deterioration when struck by an electron beam. The remaining subframes can then be covered with a more permanent material, for example, p-graphite which, due to its high specific heat withstands extensive exposure to the electron beam. By having more than one frame covered with a given material available, destruction of one target by high voltage will not cause the tube to become completely useless. If desired, each individual frame may contain a different target material, or half of each frame may contain one type of material with the other half forming a mounting for a different material.

While not specifically shown, a rotatable target frame can also be used. One such arrangement could have the subframe mounted on a circular frame supported transversely of the tube in the longitudinal position of the present target. The outer rim on the circular frame could then be slidably held within a track in the inner circular surface of the tube and provided with arcuately spaced internal magnets of good permanent strength. Rotation of the targets would be accomplished by using an external magnet operating in conjunction with the internal magnets mounted in the rim of the targets. Thus, each of the targets could thereby be rotated into the path of the electron beam.

When operating in the low voltage range contemplated with the present invention, targets are maintained on a very thin scale, for example, about 1-millionth of an inch or 500 angstroms. Accelerating voltages at the gun of up to 10,000 volts are available, however, lower voltages are preferred.

The fluorescent screen 22 on the tube 25 is formed of an aluminum coating applied to phosphor. Suitable phosphors include P–4 which has a white fluorescent color thereon and P–31 having a green fluorescent color. These aluminum and phosphor screens enable the apparatus of the present invention to be used for demonstration experiments on network or closed circuit television since the diffraction patterns are displayed with improved brilliance enabling such patterns to be photographed under usual studio conditions. This feature also permits easier observation by large groups in the classroom or lecture hall under normal illumination conditions.

The diffraction patterns produced on the screen 22 are clearly observable, sharply defined, and easily measured with sufficient degree of accuracy so as to enable the necessary computations to be made to effectively comprehend the particularities of the experiment. The wave length of the electrons, or the lattice constant if preferred, can readily be determined as will be decsribed hereinafter. The pattern dimensions can be varied to suit the particular need by modifying or changing the accelerating voltage to give an adequate collection of data.

A change in the operating potentials is achieved by suitable adjustments provided on the control panel 23 of the cabinet 21 which will be specifically described hereinafter. As seen in the schematic diagram of FIGURE 4, the usual wall plug 50 is provided for connection to a suitable source of supply, and has a toggle switch 51 and fuse 52 in series with one side of the line. A neon glow light 53 or the equivalent, is physically mounted on the face of the control panel, and is electrically connected across the power line serving to indicate to the operator when the line switch 51 is closed to energize the circuit which will be briefly described.

In general, the power supply shown in the schematic diagram may be termed a positive and variable high voltage supply. A negative high voltage supply of similar characteristics is equally suitable, that is, the cathode of the diffraction tube may be operated at a negative voltage with respect to the anode which is maintained at ground potential. One reason for following the latter procedure is to further reduce the possibility of shock hazard to the operator of the equipment.

The line voltage is supplied through the power plug 50 to the primary winding of a variable transformer 54, with a fixed transformer 55 wired in parallel therewith. The variable transformer 54 has an adjustment tap control 66, which as seen in FIGURE 1, is physically positioned on the control panel immediately to the right of the screen 22. This permits the accelerating voltage to be readily adjusted on the input side of the high voltage or power source 56. In FIGURE 4, the high voltage or power source 56 is shown in block form, it being understood that it consists of any form of known high voltage rectifier section and associated circuit to develop sufficient potential to drive the associated circuitry in the practice of the present invention. The positive terminal on the output side of the high voltage power source 56 is connected through a 2 kilohm resistor 57 to a pair of Zener diodes 58 and 59.

A horizontal centering control 60, and vertical centering control 61 comprise five megaohm poteniometers with the former being connected directly to the deflection plate D1 (FIGURE 5) while the latter is connected to the deflection plate D4, which is also shown schematically on the basing diagram of FIGURE 5. These controls permit the electron beam to be shifted slightly to probe each of the target materials in the target frame 33.

A 6 megohm resistor 62 is serially joined to a 2 megohm potentiometer 63, the tap of which provides the focusing voltage at the terminal 5 leading to the focusing grid with a maximum voltage of 4,000 volts DC being available. A 3 megohm resistor 65 connects the focusing potentiometer to ground. Filter capacitors 66′ and 67′ are wired in parallel with the Zener diodes 58 and 59 in the deflection circuit and have a value of 0.01 mfd.

The transformer 55 is provided with a pair of secondary windings 67 and 68, with the former providing the usual 6.3 volts filament voltage to the filament terminals 1 and 14 (also shown in FIGURE 5). The other secondary winding 68 is connected through a pair of diodes 69 and 70 and a fixed resistor 71 having a value of 100 kilohms to the second grid connected through terminal 8 of FIGURE 5. A fixed center tap from the secondary winding 68 leads through a 10 kilhom resistor 72, diodes 73, 74 in series with a resistor 75 having a value of 560 kilohms to a potentiometer 76 which permits manual variance of the voltage on the first or control grid connected to terminal 3 of FIGURE 5. The potentiometer 76 serves as an intensity control to permit adjustment of the electron beam strength depending on the target probed. In order to protect the screen from possible damage an additional variable resistance 77 is provided in series with the intensity control 76 as well as a fixed resistor 78 leading to ground. The cathode 2 is connected to ground through a jack 79 which in practice is physically disposed on the rear portion of the cabinet 21 to enable current readings to be taken by an external meter. In practice, the variable resistance 77 is physically positioned on the rear of the cabinet 21, and is available as a screwdriver adjustment for the calibration, having from zero to 100 kilohms resistance available, while the serially connected fixed resistor 78 has a value of the order of about 47 kilohms. Stabilizing capacitors 84, 85 and 86 complete the rectifier network having values of 0.01, 10 and 8 mfd. respectively, while the load resistor 99 in parallel with capacitor has a resistance value of 470 kilohm.

A voltmeter 80 is connected between ground and the high voltage lead 81 with a high value (95 megohm) fixed current limiting resistor 82 and a variable resistance 83 (5 megohm) in series therewith, the latter being available to permit meter calibration. The voltmeter 80 has a scale reading up to maximum of 10,000 volts which is the voltage available at the anode 90 through the high voltage lead 81. The voltmeter 80 as seen in FIGURE 1, is mounted in the control panel 23 for ease of observation by the operator of the apparatus.

The basing diagram illustrated in FIGURE 5 shows the heater connections at 1 and 14 and the control grid connection at 3. The high voltage anode is connected through a pin connection 90 placed around the neck of the cathode ray tube as is more clearly observable in FIGURE 2. External pin connections are also provided for the deflection plates and are a special feature of the electron diffraction tube of the present invention. A distinct advantage is gained by placement of the external pin connections in the fashion shown, in that the possibility of internal arcing between leads is minimized while measurement of target and screen currents may be made directly if desired. The target is represented schematically in the basing diagram at 93 while the electrical connection to the coating on the internal wall of the tube is represented by pin 91 also referenced on the top plan view of FIGURE 2. Each of the four deflection plate connections is referenced by D and an appropriate consecutive subscript.

In the illustrated embodiment of the present invention, a conductive coating 64 formed, for example, of graphite, is deposited on the interior walls of the glass envelope in a spiral pattern which provides a substantially uniform field in the tube while, at the same time, enabling visual inspection of the tube interior adjacent the target 33. Preferably, the spacing between laterally-adjacent strip portions of the conductive coating will not exceed ¼ inch. In this manner, the anode voltage is substantially constant within the tube enabling the measurement of lattice constants which closely check (within 2%) of handbook values. While the illustrated spiral pattern is preferred, it should be appreciated that equivalent spaced-apart strips of conductive coating can be suitably employed in place thereof.

In the operation of the present device the maximum anode voltage is of the order of 10,000 volts D.C., and the input wattage on starting or when the beam is "off target" should not exceed 1 watt at maximum in order to protect against possible injury to the screen 22. By 1 watt it is meant that the product of anode voltage and average current measured at this terminal does not exceed unity or 1 watt. The intensity control 76 housing a value of 200 kilohms permits the intensity of the beam to be maintained at low values while locating it on the target at which time the input wattage may be increased to exceed 1 watt since the target will "absorb" a great deal of the beam energy.

Protection against screen damage may be afforded by using an ammeter during the experiment which may be connected to the external jack 79 shown in the schematic diagram of the power supply. This permits direct measurement of currents, keeping the operator advised of the average current at any given time during this experiment. Under some circumstances, current values may run as high as 50 to 100 microamperes for demonstrations and closed circuit television slightly higher, however, the preferred current range is of the order of 5 to 10 microamperes in the interest of obtaining maximum tube life.

As seen in FIGURE 1, the voltmeter 80 is mounted in the control panel 23 as is the voltage control 66. Each of the horizontal and vertical centering controls 60 and 61 are readily accessible on the face of the panel 23, with all controls being isolated from the high voltage by a suitable fiber connection between the operating knob and the shaft on the potentiometer to isolate the high voltage from the face of the panel. An intensity control and focusing controls 76 and 63, respectively, complete the arrangement of operating adjustments.

The operation of the apparatus will now be described. By way of introduction, in the early 1920's, De Broglie predicted that wave length of matter waves could be found by using the same relationship that held for light, namely that the wave length of a light wave is equal to Planck's constant divided by the momentum of the photons. By substitution of equivalent values and known constants, the wave length in angstroms is equal to the square root of the fraction having a numerator of 150 and denominator "V," the latter being accelerating potential in volts. Described mathematically, this reduces to:

$$\lambda = \sqrt{\frac{150}{V}}$$

When voltages below 10 kv. are used, electron energies are nonrelativistic and no relativistic correction factor is needed.

When electrons are transmitted through a thin film of randomly oriented crystals, diffraction patterns are produced by the electron beams passing through the film. From the measurement of the size of the diffraction rings on the fluorescent screen, the wave length of the electrons can be computed from Bragg's relationship which is $$\lambda^* = 2d \sin \theta \frac{1}{n}$$

where $\lambda^*$ is the wave length of the electrons calculated by Bragg's law, $\theta$ is the ordinary angle between the incident beam and the reflecting plane, which is the same as the angle between the reflected beam and the reflecting plane and $n$ is the order of the reflection. Obviously, $\lambda$ and $\lambda^*$ represent the wave length of the same electrons calculated in different manners and as expected, $\lambda^*$ calculated by Bragg's law, when compared with $\lambda$ in De Broglie's equation, was found to be in strict agreement, with the normal allowance for measuring errors.

As seen in FIGURE 6, when a thin film target 100 is positioned a known distance D from a screen 101, and an electron beam 102 is passed through the thin film target 100, ring diffraction patterns A and B are produced about a central axis O. The distance or radius of the first circle AO is illustrated adjacent the diagram by the small letter $r$, representing the radius from the center axis O. The angle defined by the lines AXO is designated as $2\theta_1$ which may be expressed as being equal to $r$ divided by 2D for small angles of theta $\theta$. In the ring diffraction pattern of this type, Bragg's mathematical relationship $$2d \sin \theta = n\lambda^*$$

When $\theta$, $n$ and $d$ are known, $\lambda$ may be calculated readily. In this equation $d$ is the separation between lattice planes, $\lambda$ is the wave length of electrons in angstroms, $\theta$ is the ordinary angle between the incident beam and reflecting plane, which is the same as the angle between the reflected beam and reflecting plane, and $n$ is the order of reflection. Similarly, when the wave length is known or given, the angle $\theta$ may be readily measured and $d$, the distance or separation between lattice planes can be readily calculated also.

Through varying the voltage and taking successive measurements of the rings, data may be taken for $2\theta_1$ and $2\theta_2$ which data may be analyzed first by De Broglie's relationship and then by Bragg's law with appropriate tables to supply the values of the square root of the Miller indices. The atomic planes of the target material from which the diffraction occurs may be determined as well as permitting computation of the wave length and lattice spacings for comparison with X-ray data. This is made possible by the direct measurement of voltage and the angle $\theta$ with the present invention.

When hexagonal pyrolitic graphite is investigated, a spot pattern is presented on the screen 101. Measurement between the hexagonal dots may be made directly on the screen as well as the radius of the spots from the center O. The distance $d$ is the separation between the planes which may be determined first by calculating the wave length $\lambda$ from De Broglie's relationship and substituting in Bragg's relationship $\lambda$ for $\lambda^*: d = \lambda D/r$ where $\lambda$ is the wave length in angstroms, D is the distance to the screen and $r$ is the radius from the center to the spot diffraction pattern. Once $d$ is determined, the lattice constant $a$ for hexagonal pyrolytic graphite may be calculated and compared with known constants obtained by X-ray measurement.

Ring diffraction patterns may also be obtained with p-graphite depending on how the p-graphite crystals "appear" to the incident beam of electrons. Thus, a single target material by careful probing may provide demonstrations of both types of patterns, ring and spot.

It is contemplated that the power supply components having magnetic fields will be shielded from the diffraction tube to minimize the effect on the electron beam. Any suitable form of shielding will suffice.

Various modifications and changes from the above-described embodiment will be apparent to those skilled in this art without departing from the spirit and scope of the present invention. Accordingly, this invention is to be limited only by the scope of the appended claims.

We claim:
1. An educational apparatus for investigating the wave length of electrons, comprising a permanently evacuated cathode ray tube having a neck portion at one end and a screen at the opposite end, an electron gun mounted in said neck portion, a target frame intermediate of said electron gun and said screen, said target frame being disposed in the projected path of electrons emitted from said gun, a thin target material mounted on said target frame, an electrically conductive anode coating applied to the interior of said tube as a continuous strip for establishing an anode voltage in said tube which is substantially uniform, the spacing between laterally-adjacent strip portions of said electrically conductive coating generally not exceeding ¼ inch, said continuous electrically conductive strip permitting visual inspection of the interior of the cathode ray tube, power supply means electrically connected to said electron gun and including means to vary the voltage applied to said electron gun, means associated with said power supply means to control the trajectory of electrons emitted from said gun to direct said electrons to strike said target material thereby diffracting said electrons, coating means on said screen to display diffraction patterns caused by said electrons striking said target and said screen with sufficient sharpness and persistency to permit the manual measurement of the dimensions externally of said tube.

2. The apparatus of claim 1 wherein said electrically conductive anode coating comprises a spirally wound graphite strip.

3. The apparatus of claim 1 wherein multiple target materials are mounted on said target frame.

4. The apparatus of claim 1 wherein said coating means on said screen comprises a layer of phosphor coated with aluminum.

5. The apparatus of claim 1 wherein said target material is characterized by a resistance to thermal shock and higher temperatures to an extent that diffraction patterns produced therewith will not be adversely affected by heating such material to the melting temperature of the glass forming the envelope of said cathode ray tube.

6. The apparatus of claim 1 wherein said target material is formed of pyrolytic graphite.

7. The apparatus of claim 1 wherein said target material is formed of polycrystalline aluminum.

8. The apparatus of claim 1 wherein said target material is selected from the group consisting of pyrolytic graphite, polycrystalline aluminum, magnesium oxide, manganese oxide, molybdenum oxide, germanium, alpha iron and mica.

References Cited

UNITED STATES PATENTS

| | | | |
|---|---|---|---|
| 2,131,536 | 9/1938 | Knoll et al. | 250—49.5 |
| 2,257,774 | 10/1941 | Von Ardenne | 250—49.5 |
| 2,271,990 | 2/1942 | Ramberg et al. | 250—49.5 |
| 2,319,811 | 5/1943 | George et al. | 313—51 |
| 2,515,926 | 7/1950 | Lepoole | 250—49.5 |
| 2,606,292 | 8/1952 | Columbe | 250—49.5 |
| 2,740,065 | 3/1956 | Jesty | 313—92 |

WILLIAM F. LINDQUIST, *Primary Examiner.*